Dec. 17, 1935.  N. SULZBERGER  2,024,612
REFRIGERATOR
Filed Nov. 9, 1933   2 Sheets-Sheet 1
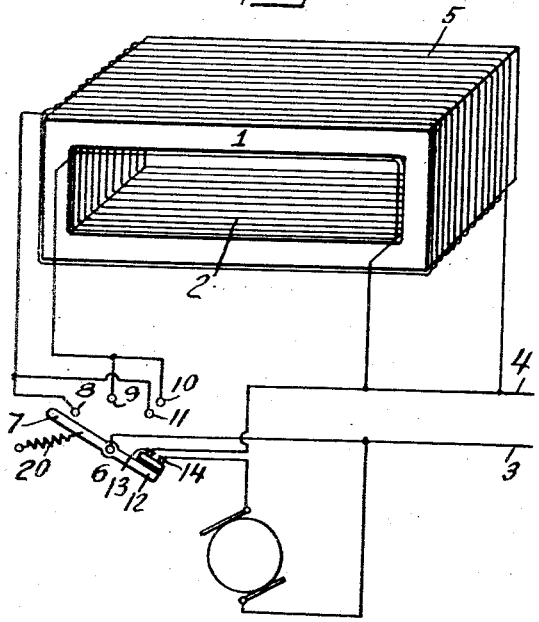
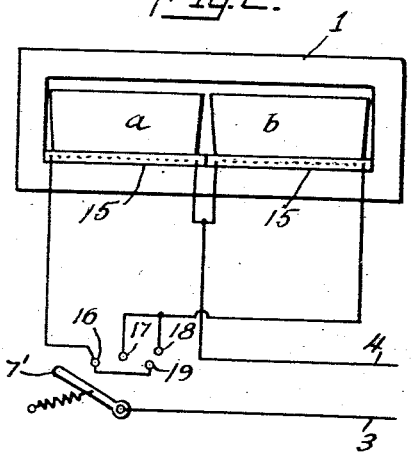
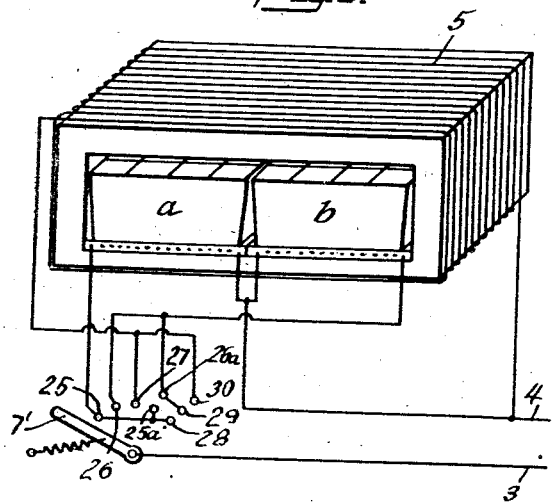
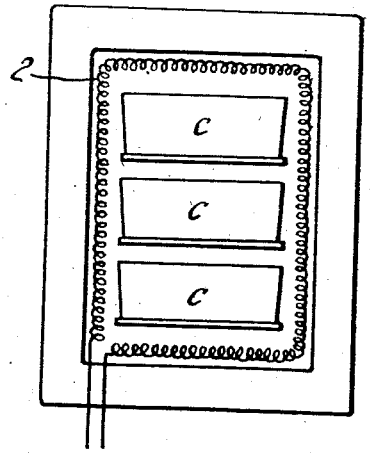
INVENTOR Dec. 17, 1935.  N. SULZBERGER  2,024,612
REFRIGERATOR
Filed Nov. 9, 1933   2 Sheets-Sheet 2
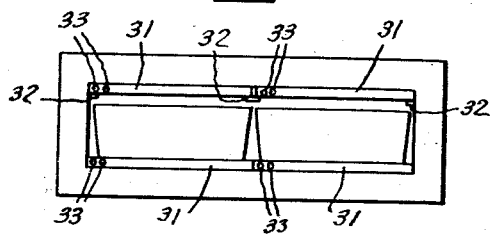
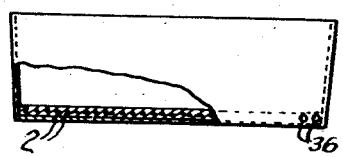
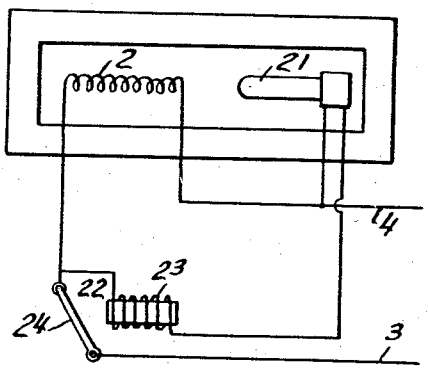
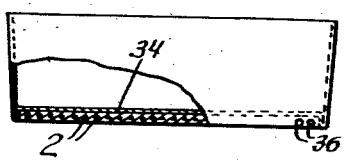
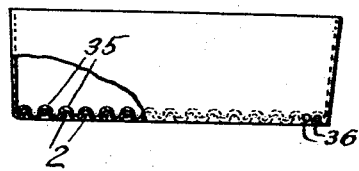
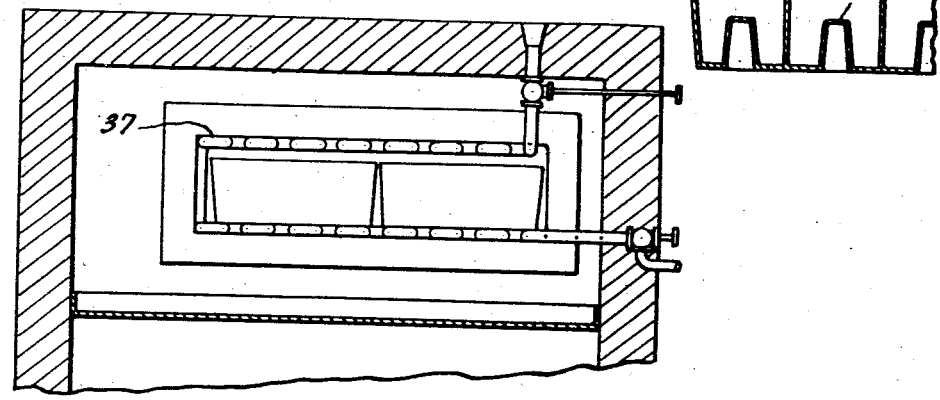

Patented Dec. 17, 1935

2,024,612

UNITED STATES PATENT OFFICE 2,024,612

REFRIGERATOR

Nathan Sulzberger, New York, N. Y.

Application November 9, 1933, Serial No. 697,265

4 Claims. (Cl. 62—113)

This invention relates to refrigerators and particularly mechanical refrigerators, such as those used in private homes for the preservation of foods and for the formation of ice cubes.

Such refrigerators usually comprise a chilling unit for cooling the food compartment and the chilling unit usually contains several trays in which water may be frozen into ice cubes. Due to the collection of frost and ice on and within the chilling unit the ice cube trays frequently freeze so tight to the chilling unit that it is very difficult to remove them. This is especially true when any water is allowed to remain on the bottoms of the trays after filling them because a film of ice then forms between the bottom of each tray and the chilling unit and causes it to adhere tenaciously to the chilling unit. In order to loosen the trays it is sometimes necessary to resort to the use of a sharp instrument, such as a knife, to pry the trays loose, but this may cause injury to the chilling unit and to the trays.

I have found that the trays may be quickly loosened, after they have been frozen to the chilling unit, by the correct application of heat, i. e., by the use of heat so applied and at such an intensity that the trays will be loosened very quickly without the necessity of resorting to defrosting of the chilling unit to accomplish this purpose and without materially melting the ice cubes. However, a slight melting of the cubes sufficiently to permit them to be readily removed from the trays is advantageous under certain circumstances and according to my invention the trays may not only be loosened so that they may be quickly and readily removed from the chilling unit but the cubes may at the same time be sufficiently loosened in the trays so that they may be readily removed therefrom after the trays have been removed from the chilling unit.

The principal object of the invention is to provide an improved method of loosening the ice cube trays after they have become frozen to the chilling unit and improved means for carrying out the method.

A further object of the invention is to provide an improved method of and means for loosening the ice cube trays and at the same time loosening the cubes in the trays sufficiently to permit their ready removal from the trays without unduly melting the cubes.

According to my invention heat is applied, either by instrumentalities built permanently into the refrigerator or by an attachment temporarily or permanently applied, directly at or close to the places where the trays adhere to the chilling unit and the intensity of the heat is sufficient to loosen the trays in such a short period of time that no prolonged waiting is necessary for the trays to become loosened. The heat may be applied just long enough to loosen the trays without affecting the ice cubes, or if desired the cubes may be melted just enough to permit them to be readily removed from the trays. The invention is distinguished in these particulars from defrosting devices heretofore proposed which will, of course, loosen the trays after defrosting has progressed far enough but such devices are not intended, nor well adapted, to bring about a quick loosening of the ice cube trays when it is desired to remove one or more of them without waiting for defrosting to take place.

Several embodiments of the invention are illustrated in the accompanying drawings in which Fig. 1 is a diagrammatic view showing one way in which the invention may be applied to the chilling unit of a refrigerator;

Fig. 2 is a diagrammatic view illustrating a modification of the invention;

Fig. 3 is a diagrammatic view showing the tray-heating means of Fig. 2 supplemented by defrosting means;

Fig. 4 is a diagrammatic view showing the manner in which the trays may be heated by radiation;

Fig. 5 is a front elevation of a chilling unit illustrating a further modification;

Fig. 6 is a diagrammatic view illustrating the use of an automatic controlling device for the tray heating means;

Figs. 7, 8 and 9 are end views partly in section of ice cube trays showing various ways in which the heating means may be applied directly to the trays; and Fig. 10 is a front elevation of a chilling unit in which the heat for loosening the trays may be some other medium than electricity;

Fig. 11 is a broken sectional view of an ice tray well adapted for use with the invention.

In Fig. 1 a chilling unit of a refrigerator is represented at 1. Located within the chilling unit is an electric resistor 2 to which electric current may be supplied from a source of current through leads 3 and 4. In the form of the invention shown in this figure the resistor 2 is in the form of a coil of wire or a resistor band so positioned that it surrounds the ice cube trays. When the coil is energized it supplies heat in the immediate vicinity of the trays, and especially to the bottoms of the trays. In Fig. 1 the chilling unit is also supplied with an external resistor 5 which may be used to defrost the entire chilling unit. A suitable controlling device such as a switch shown at 6 may be used to supply current either to the resistor 5, to the tray-heating resistor 2, or to both simultaneously. When the switch arm 7 is over the contact 8 current will be supplied to the resistor 5 to defrost the chilling unit. When the switch arm 7 is over the contact 9 current will be supplied to the tray loosening resistor 2. In another position of the switch arm 7 it simultaneously covers two contacts 10 and 11 so that current will be supplied simultaneously to the two resistors 2 and 5. In this way the tray-heating resistor 2 may be used to assist the resistor 5 in defrosting the chilling unit if so desired. If the refrigerator be of the electric type and if it be desired to discontinue refrigeration during defrosting or when the trays are being loosened the switch 6 may be utilized to break the circuit of the refrigerating system when it is moved to circuit-making position for the resistors 2 and 5. For this purpose the switch arm 7 may have an extension 12 which normally completes the circuit of the refrigerating system through two contacts 13 and 14, but when the switch arm is moved to energize either the resistor 2, the resistor 5, or both, the extension 12 on the switch arm moves away from the contacts 13 and 14 and breaks the circuit of the refrigerating system.

The resistor for loosening the trays may be located in a false bottom upon which the trays may rest as shown at 15 in Fig. 2. The circuit connections and switching device shown in this figure are such that current may be supplied to the resistor under any one particular tray or under all the trays simultaneously. When the switch arm 7' is over the contact 16 current will be conducted from the lead 3 through the switch arm to the resistor which lies under tray a and then out through the lead 4. If the switch arm 7' is over the contact 17 current will be conducted from the lead 3 to the resistor under tray b and out through the lead 4. In another position of the switch arm it lies over contacts 18 and 19 in which event current will pass from the lead 3 through the switch arm and then divide, part of it going through the resistor under the tray a and the other part through the resistor under the tray b. If desired, the switches shown in Figs. 1 and 2 may be provided with means for returning them to normal position after they have been released, such for instance, as a spring shown at 20.

When the chilling unit is provided with a defrosting resistor in addition to the tray heating resistors a switch mechanism of the kind shown diagrammatically in Fig. 3 may be employed so that current may be supplied to the resistor of any particular tray, to the resistors of all the trays, to the defrosting resistor, or to all of the resistors simultaneously. If the switch arm 7' is over a contact 25 current will be supplied from the lead 3 through the switch arm to the resistor under the pan a and out through lead 4. If the switch arm is over contact 26 current will be supplied from the lead 3 through the switch arm to the resistor under the pan b and out through lead 4. If the switch arm is over contact 27 current will be supplied from the lead 3 through the switch arm to the defrosting resistor 5 and out through the lead 4. In another position of the switch arm it will lie over contacts 25a and 26a in which case current from the lead 3 will divide at these contacts, part going through the resistor under tray a and part going through the resistor under tray b. In the last position of the switch arm it will lie over contacts 28, 29 and 30, in which case current from the lead 3 will pass through the switch arm and will divide at contacts 28, 29 and 30, part going through each of the three resistors. In this way any particular tray may be loosened, or all of the trays may be loosened simultaneously, the defroster may be operated independently of the tray loosening means, or the tray loosening resistors may be utilized to assist the resistor 5 when it is desired to defrost the chilling unit.

In the form of the invention shown in Fig. 4 the tray-heating resistor 2 surrounds the trays c and heats them by radiation rather than by conduction.

The heating means for the trays may take the form of separate heating units such as shown at 31 in Fig. 5. They may constitute separately made attachments which may be installed in the chilling unit of an existing refrigerator, and if desired they may be removed after temporary use. A unit may be inserted under each pan as shown in Fig. 5 and if desired one or more units may be located in other parts of the chilling unit. For instance, a unit may be suspended over each pan by any suitable means such as brackets 32. When the tray heating means is in the form of units as just described each unit is preferably provided with means whereby it can be plugged into the electric circuit. For instance, each unit may have a pair of pins 33 to which an electric plug may be connected when it is desired to loosen the tray with which that unit is associated.

If desired the supply of heat for loosening the trays may be automatically controlled so that it will be automatically discontinued as soon as the trays have become sufficiently loosened to permit their removal. Such means may take the form of a thermostat represented diagrammatically at 21 in Fig. 6 properly positioned so that when the heat from the resistor 2 has reached a predetermined value sufficient to loosen the trays the thermostat will operate to break the circuit. To effect this the switch diagrammatically represented at 22 may be controlled by the thermostat so that at the proper time the thermostat will cause an electro-magnet 23 to be energized to attract the switch arm 24 and thereby interrupt the supply of current from the leads 3 and 4 to the tray heating resistor 2.

The heating means for loosening the trays may be associated directly with the trays as shown in Figs. 7, 8 and 9. In Fig. 7 the resistor 2 is located in the bottom of the tray. In Fig. 8 the bottom of the tray is bulged upwardly as shown at 34 to accommodate the resistor whereas in Fig. 9 the resistor is positioned in corrugations 35 in the bottom of the tray. Of course, resistors may be similarly associated with the side walls of the trays if so desired. Pins 36 may be provided on each tray so that any desired tray may be plugged into the electric circuit and thereby heat the tray to free it from the chilling unit. If desired the heating devices may be in the form of attachments for the trays, the same being permanently or temporarily applied.

The invention is not limited to the use of any particular heating medium. Water, hot air, or other suitable heating medium may be used in which case the means for conducting the heating medium may take the form of a coil of pipe 37 suitably positioned in the chilling unit, and through which the heating medium may pass as illustrated in Fig. 10.

When the resistor is associated with the walls of the chilling unit it may be embedded in its walls or it may be positioned in corrugations in the chilling unit, or it may be positioned against the surface of the chilling unit. In any event, the resistor itself should be properly insulated or if not insulated the surface of the chilling unit should be properly treated or coated to insulate the resistor from the metal of the chilling unit and to insulate the turns of the resistor from one another. Likewise, where the heating means is associated directly with the trays as in Figs. 7, 8 and 9 the resistor should be insulated or the bottom of the pan treated or coated in such a way that the turns of the resistor will be insulated from one another and insulated from the metal of the pan and safe-guarded from the effects of moisture.

The switching and controlling devices herein shown and described are by way of example only. Various other circuit-selecting and circuit-completing means may be used. For instance wires may extend from the various resistors to a suitable point or points on the outside of the refrigerator where the various circuits may be plugged in or be switch controlled.

It will now be seen that the important feature of the invention is the application of heat in the immediate vicinity of the trays to free them from the chilling unit in a short period of time, the heat supplied being of sufficient intensity to accomplish this. The invention is not limited to any particular form of heating means but on the contrary may take various different forms as evidenced to some extent by the examples described above. Moreover, the heating means may be variously positioned in the chilling unit so that only the surface on which the trays rest is heated or so that any or all parts of the interior of the chilling unit are heated either by radiant heat or direct conduction, or the heat may be applied directly to the trays themselves. The tray-heating means may be built in the refrigerator when it is manufactured, or it may be in the form of a separate attachment adapted for use in refrigerators already in existence. Automatic devices, such as the thermostat above described, may be utilized to control the supply of heat and to cut it off at the appropriate time and these devices may be located either in the chilling unit or any where in the refrigerator where it is desired to protect that part of the refrigerator from excessive heat. If it is desired to remove only one tray that particular tray may be heated to the exclusion of the others or all of the trays may be simultaneously heated. If the chilling unit is equipped with defrosting means the defroster may be operated alone or the tray-heating means may be operated simultaneously therewith in which case the heat produced by the tray-heater may be utilized to augment the heat used for defrosting. Preferably during defrosting the tray-heating means is not employed unless it is desired to melt the cubes entirely so as to change the water in the trays.

The wire for the tray-heating means should be such that it will produce the proper intensity of heat within a short interval of time. This may be accomplished by using a wire of the proper resistance or by using the proper number of turns of the wire. Ordinarily the resistor for the tray-heating means should be more powerful than the one used for the defroster so as to act more quickly than the defroster.

If conditions are properly adjusted it may be possible to keep the heating device for the trays in operation continuously to prevent the trays from freezing to the chilling unit without interfering with proper functioning of the refrigerator or the freezing of the cubes in the trays, but it is believed that the preferred practice is to apply the heat to loosen the trays only when it is desired to remove them.

By the use of my invention the trays may be quickly loosened without resorting to what is commonly recognized as a defrosting operation. The trays may be loosened and removed before the cubes have materially melted, but a slight melting of the cubes is advantageous as they may be readily removed from the trays as soon as the trays are removed from the refrigerator. The tray-heating device may be so operated as to not only loosen the trays but also to loosen the cubes, in cases where this is desired, thus making unnecessary the additional step usually resorted to to loosen the cubes, such as holding the trays under water long enough to melt them slightly. My invention may therefore be used, if so desired, to eliminate at one and the same time two existing inconveniences, first the difficulty of removing the trays from the chilling unit and second the difficulty of removing the ice cubes from the trays.

It will be understood that in cases where the supply of heating medium to the tray loosening means is hand controlled as by means of a switch, the switch will be left in circuit closing position for the correct interval of time to effect loosening of the tray. If it be desired to loosen the ice cubes in the tray in addition to loosening the tray, the switch should be left in circuit closing position long enough to effect this but not so long as to materially melt the ice cubes.

Where I have referred above to the freezing of the trays in the chilling unit, or to loosening of the trays from the chilling unit, I mean to include the freezing of the trays to, and the release of the trays from, any adjacent surface, whether such surface be a surface of the chilling unit proper, a surface of the heating device, or a surface of an adjacent tray.

A form of tray well adapted for use with my invention is shown in Fig. 11. The tray may have indentations, lugs, projections or the like, represented at 38. These not only cause quicker freezing of the water but cause quicker partial melting of the cubes when the heat is applied to loosen the trays and loosen the cubes. If desired the heating resistor, whether associated with the chilling unit, or the tray itself, may extend up into the projections.

I claim:

1. In a mechanical refrigerator having a chilling unit provided with a compartment adapted to contain an ice tray, means for applying heat to a tray in said compartment and by conduction and by radiation through ice therein.

2. In a mechanical refrigerator having a chilling unit provided with a compartment adapted to contain an ice tray, a heating element arranged within the chilling unit for applying heat to a tray within said compartment by conduction from below, a radiant heating element in said compartment for applying heat by radiation to a tray therein from above, and means for heating said elements when desired to effect loosening of a tray in said compartment and of ice cubes in said tray.

3. In a mechanical refrigerator having a chilling unit provided with a compartment adapted to contain an ice tray, a heating element arranged within the chilling unit for applying heat to a tray within said compartment by conduction from below, a radiant heating element in said compartment for applying heat by radiation to a tray therein from above, and from the sides, and means for heating said elements when desired to effect loosening of a tray in said compartment and of ice cubes in said tray.

4. In a mechanical refrigerator such as defined in claim 2, the provision, in the bottom of the tray, of indentations extending part way through the cubes of ice when frozen, whereby increased metal surface is provided in contact with the ice, both while being frozen and while the trays are being heated to loosen the trays and to free the ice cubes therefrom.

NATHAN SULZBERGER.